(12) United States Patent
Perry et al.

(10) Patent No.: US 12,709,207 B2
(45) Date of Patent: Aug. 18, 2026

(54) SEAT MEMBER WORKSTATION ASSEMBLY

(71) Applicant: LEAR CORPORATION, Southfield, MI (US)

(72) Inventors: John Perry, Wyandotte, MI (US); Abhishek Yadav, Maharashtra (IN); Purushottam Patil, Chinchwad (IN); Michael Corvino, Canton, MI (US); Jason Sacco, West Bloomfield, MI (US); Julia Waelchli, Saint Clair Shores, MI (US); Robert Elliott, Maharashtra (IN); Kshitija Vaidya, Mumbai (IN)

(73) Assignee: LEAR CORPORATION, Southfield, MI (US)

( * ) Notice: Subject to any disclaimer, the term of this patent is extended or adjusted under 35 U.S.C. 154(b) by 371 days.

(21) Appl. No.: 18/379,284

(22) Filed: Oct. 12, 2023

(65) Prior Publication Data

US 2025/0121749 A1 Apr. 17, 2025

(51) Int. Cl.

| | |
|---|---|
| ***B60N 3/00*** | (2006.01) |
| ***A47B 83/02*** | (2006.01) |
| ***B60N 2/30*** | (2006.01) |
| ***B60N 2/32*** | (2006.01) |
| ***B60N 3/10*** | (2006.01) |

(52) U.S. Cl.
CPC .............. *B60N 3/004* (2013.01); *A47B 83/02* (2013.01); *B60N 2/3011* (2013.01); *B60N 2/3088* (2013.01); *B60N 2/32* (2013.01); *B60N 3/102* (2013.01)

(58) Field of Classification Search
CPC ........ B60N 2/3011; B60N 2/75; B60N 2/793; B60N 3/004; B60N 3/102; B60R 7/04
USPC .......................... 296/24.34, 24.46, 65.09, 69
See application file for complete search history.

(56) References Cited

U.S. PATENT DOCUMENTS

| | | | | |
|---|---|---|---|---|
| 6,588,821 | B2 * | 7/2003 | Worrell | B60N 2/2824 224/400 |
| 7,303,226 | B2 * | 12/2007 | Bernstein | B60N 2/206 296/24.39 |
| 10,457,171 | B2 * | 10/2019 | Line | B60N 2/01 |
| 10,711,883 | B2 * | 7/2020 | Keenan | B60N 2/797 |
| 12,017,589 | B2 * | 6/2024 | Ketels | B60N 3/002 |
| 2005/0127641 | A1 * | 6/2005 | Cowelchuk | B60R 21/2165 280/732 |
| 2024/0190321 | A1 * | 6/2024 | Salter | B60N 3/002 |

* cited by examiner

*Primary Examiner* — Jason S Daniels

(74) *Attorney, Agent, or Firm* — Carlson, Gaskey & Olds, P.C.

(57) ABSTRACT

A method and apparatus comprises a seat member base that includes a first substrate and a second. A living hinge couples the second substrate to the first substrate such that the second substrate is moveable between a closed position and a deployed workstation position. A magnetic closure selectively holds the second substrate to the first substrate in the closed position.

20 Claims, 6 Drawing Sheets

32
50
48
46
52
60
36
58
60
58
60
58
56
38
40
44
58
44
62
42
34

32
34
44
46
56
44

48
32
64
52
58
60
62
66
56
34
76

SEAT MEMBER WORKSTATION ASSEMBLY

BACKGROUND

Vehicles are being used as mobile offices more than ever. Increasing available work surface area within a passenger compartment increases the effectiveness of the vehicle as a mobile office.

DETAILED DESCRIPTION

Figure 1:
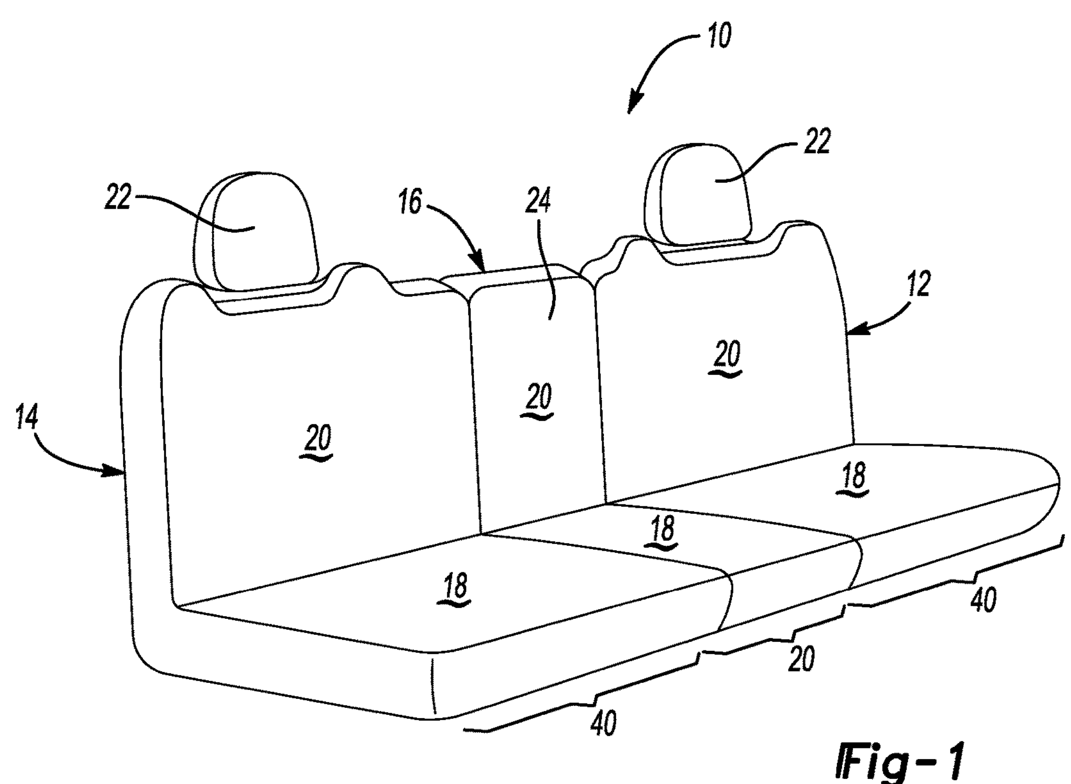
FIG. 1 is a perspective view of an example row of seats in a 40/20/40 configuration.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises." and/or "comprising." when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be understood that terms such as "about," "substantially," and "generally" are not intended to be boundaryless terms, and should be interpreted consistent with the way one skilled in the art would interpret those terms.

This disclosure relates to a seat member with a workstation assembly that provides an extended flat work surface area to support smart devices, laptops, or other work materials.

FIG. 1 illustrates a seating arrangement 10 according to one example embodiment. This seating arrangement 10 may be utilized for seating in a vehicle, such as an automobile, an aircraft, a watercraft, or any other seating environment. In this example seating configuration 10 there is a driver side seat 12, a passenger side seat 14, and a center seat 16 between the driver side seat 12 and the passenger side seat 14. Each seat 12, 14, 16 includes a seat base or bottom 18 and a seat back 20. The seats 12, 14, 16 may also include a head restraint 22 mounted to the seat back 20.

Figure 2:
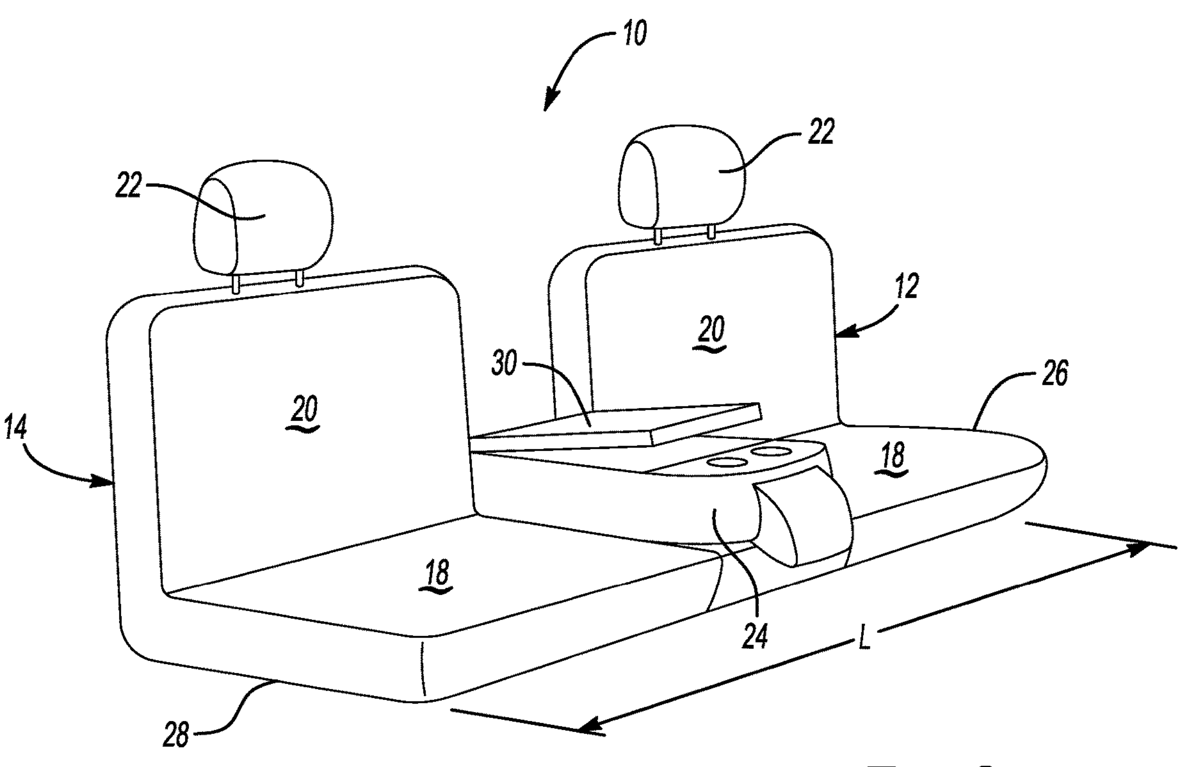
FIG. 2 is a view similar to FIG. 1 but showing the 20% seat folded to an armrest position.

In one example, a seat member base 24 is positioned between the driver side seat 12 and the passenger side seat 14. The seat member base 24 is pivotable between an upright position (e.g. seating position as shown in FIG. 1) and a lowered position (e.g. armrest position as shown in FIG. 2). An overall seating length L is defined for a row of seats including the driver side seat 12, the seat member base 24, and the passenger side seat 14. In one example, this overall seating length L is defined as extending from a driver side seat outer edge 26 to a passenger side seat outer edge 28. The seating arrangement 10 shown in FIGS. 1-2 is comprised of 20% of the overall seating length L for the seat member base 24, 40% of the overall seating length L for the driver side seat 12, and 40% of the overall seating length L for the passenger side seat 14. As such, when the seat member base 24 is in the upright seating position (FIG. 1), a center seat 16 is provided that is 20% of the overall seating length L. When the seat member base 24 is in the lowered position (FIG. 2), an armrest 30 is provided.

Figure 3:
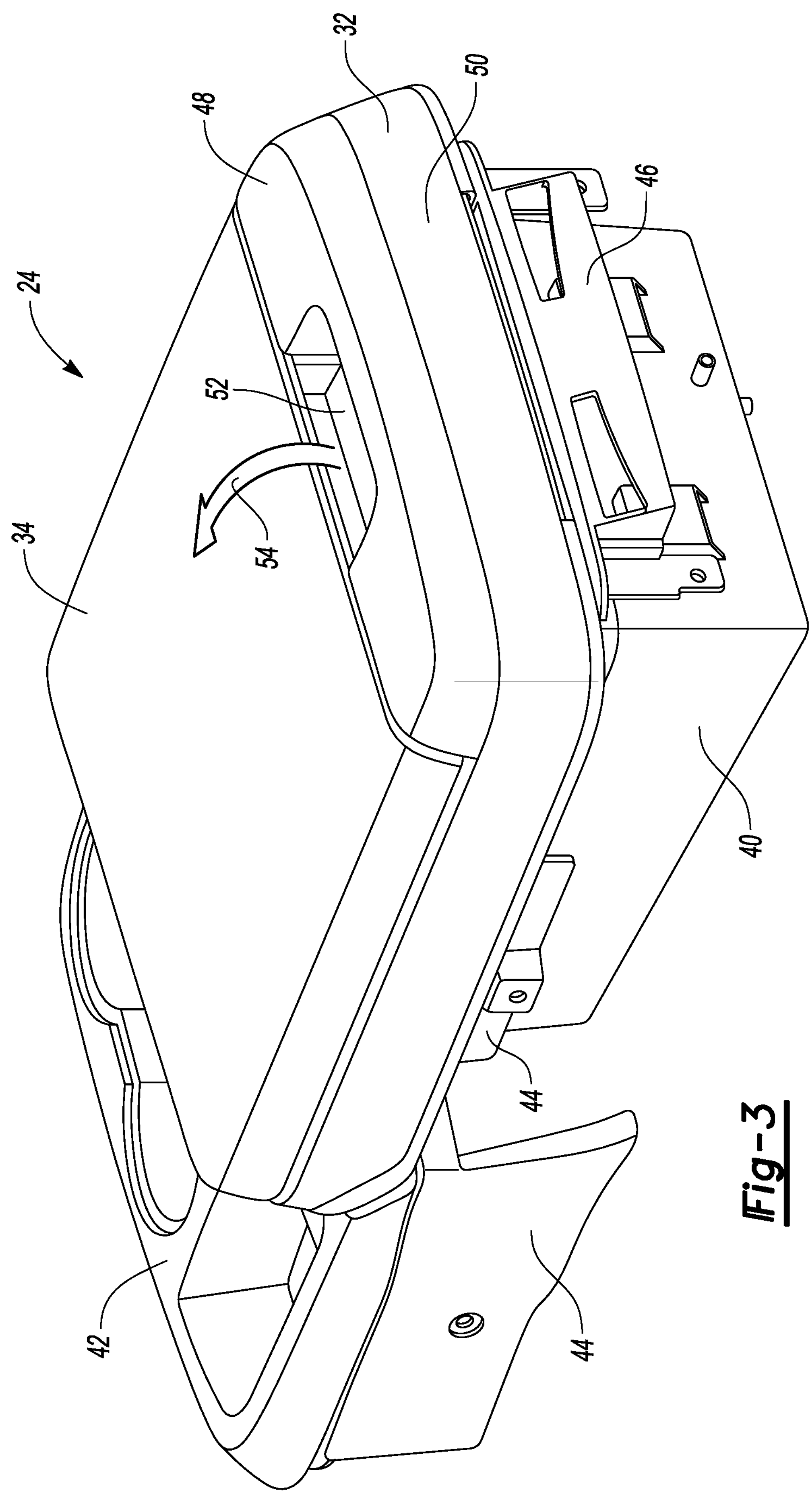
FIG. 3 is a perspective view of a workstation assembly in a closed position.
Figure 4:
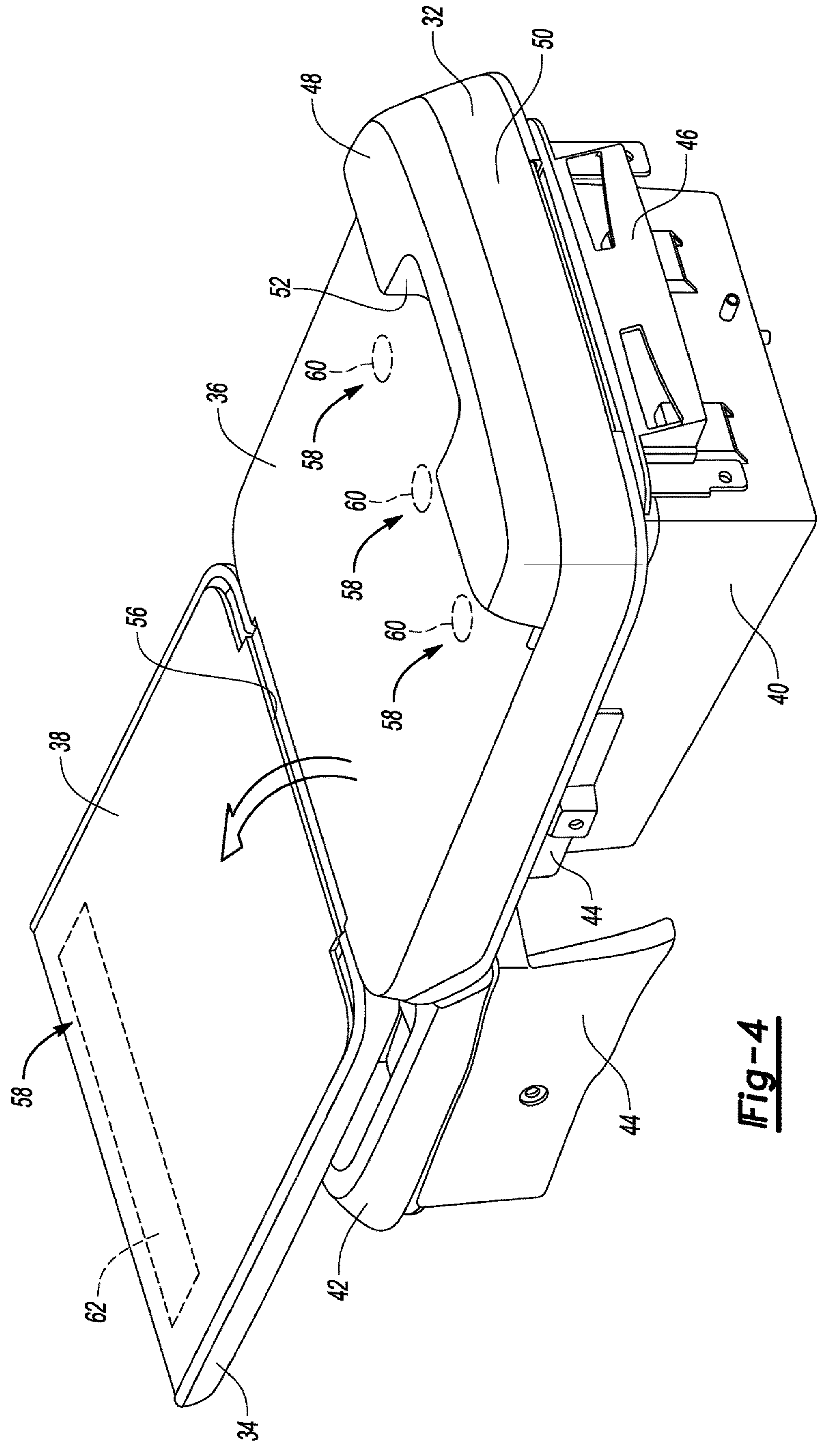
FIG. 4 is similar to FIG. 3 but shows the workstation assembly in a deployed position.

In one example, the seat member base 24 includes a first substrate 32 and a second substrate 34 as shown in FIG. 3. In one example, the first substrate 32 comprises a lower flat-plate body and the second substrate 34 comprises an upper flat-plate body. The first substrate 32 is fixed to the seat member base 24 and the second substrate 34 is moveable from a closed position (FIG. 3) to a deployed workstation position (FIG. 4) where respective upwardly facing surfaces 36, 38 of the first substrate 32 and the second substrate 34 provide an extended flat work surface. This work surface comprises a seamless transition between the fixed lower substrate 32 and the upper dynamic substrate 34 when deployed to the fold-flat position as shown in FIG. 4.

The provided workstation area thus has the lower flat-plate of the first substrate 32 forming one portion of the work surface, with the upper flat-plate of the second substrate 34 forming the remaining portion of the work surface when in the deployed position. The flat surface area of the workstation supports items such as smart devices, a laptop, or other work materials, for example.

Additionally, in one example, the first substrate 32 is fixed to, or sits upon, a storage compartment 40 (FIG. 3). Optionally, a cupholder or open storage receptacle 42 is positioned at one end of the stacked lower 32 and upper 34 substrates. When the upper substrate 34 is pivoted to the deployed position, the cupholder/open storage receptacle 42 is at least partially covered by the upper substrate 34. Also, additional bracket members/flanges 44 are provided to increase stability and support as needed. A handle portion 46 can be gripped to lift the substrates 32, 34 and gain access to the storage compartment 40.

In one example, the upper substrate 34 is shorter in length than the lower substrate 32 as shown in FIG. 3. In this example, a raised boss portion 48 extends upwardly from a forward edge 50 of the lower substrate 32 and extends to a forward edge of the upper substrate 34. The raised boss portion 48 includes a recessed area 52 for a finger clearance to grip an edge of the upper substrate 34 such that the upper substrate 34 can be manually pivoted from the closed position to the deployed position as indicated by arrow 54.

In one example, the first 32 and second 34 substrates are comprised of a plastic material; however other types of materials could also be used. The raised boss portion 48 can also be comprised of a plastic material that is the same as, or different from, the material of the first 32 and second 34 substrates.

Figure 5:
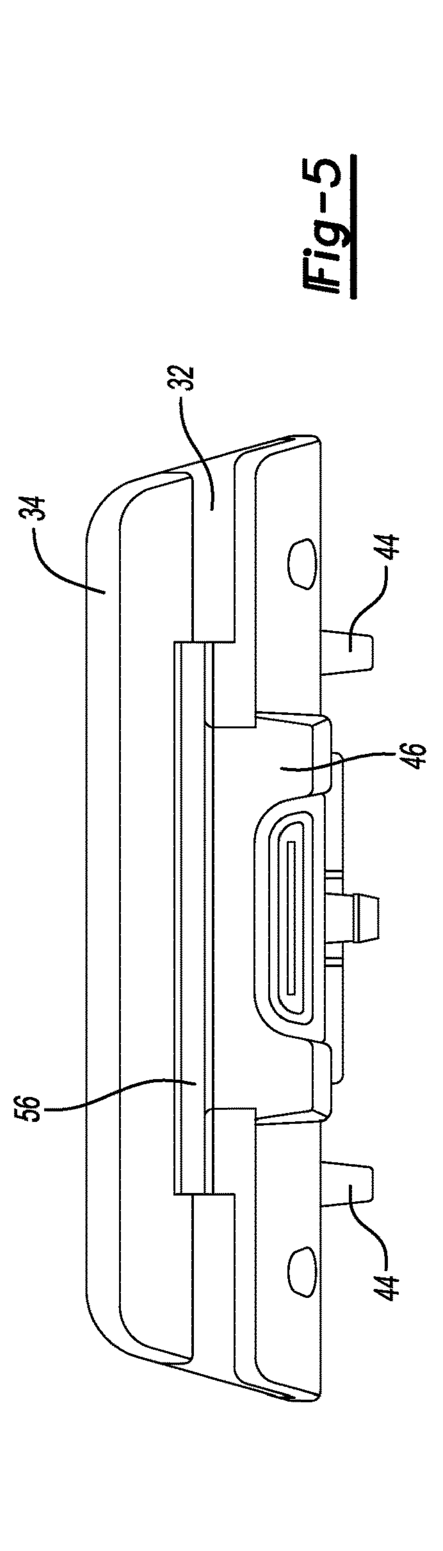
FIG. 5 is an end view of the workstation assembly of FIG. 3.

In one example, a living hinge 56 couples the second substrate 34 to the first substrate 32 such that the second substrate 34 is moveable between the closed position where the upper flat-plate substrate 34 is stacked on top of the lower flat-plate substrate 32, and the deployed workstation position where the upper flat-plate substrate 34 is pivoted away from the lower flat-plate substrate 32 to form the work surface. In one example, the living hinge 56 comprises a body made from a thermoplastic elastomer that attaches overlying edges of the first 32 and second 34 substrates together as shown in FIGS. 4-5. The use of the living hinge 56 is advantageous because it allows the assembly to withstand a significantly higher downward force on a cantilevered portion of the workstation because a hard stop does not live within the hinge itself.

In one example, a magnetic closure 58 selectively holds the second substrate 34 to the first substrate 32 in the closed position. The magnetic closure 58, in one example, comprises one or more first members 60 embedded in the first substrate 32 and one or more second members 62 embedded in the second substrate 34. The first 60 and second 62 members generate a magnetic field to draw the second substrate 34 toward the first substrate 32 for magnetic latching.

Figure 6:
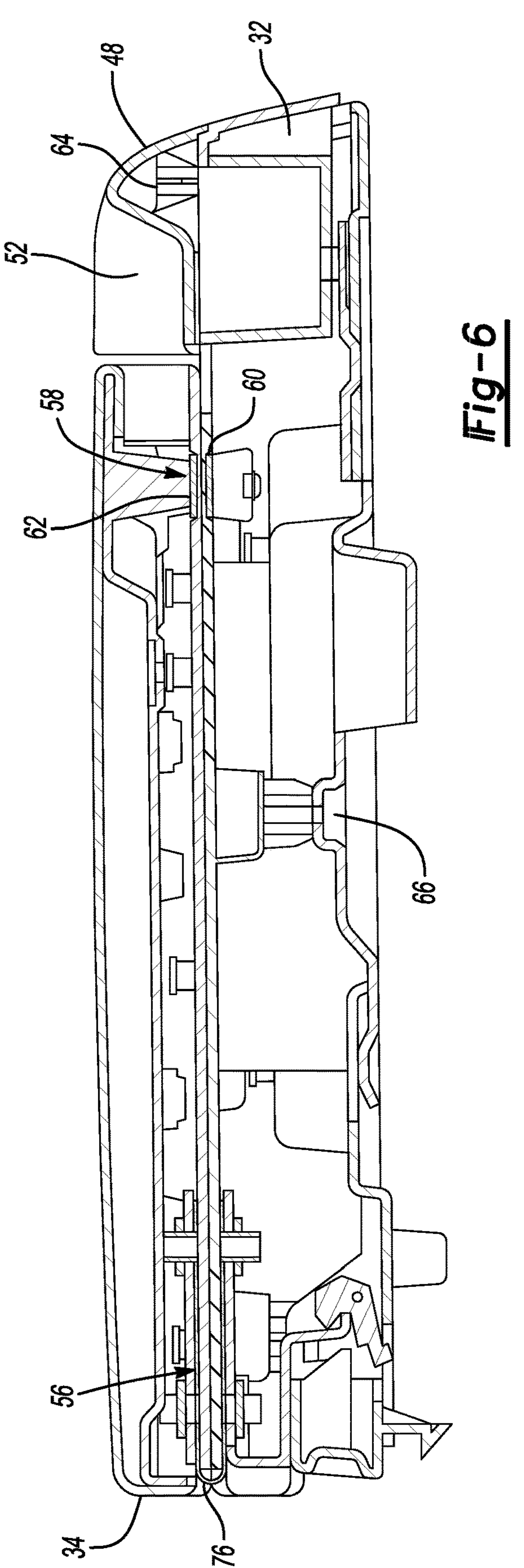
FIG. 6 is a section view along a length of the workstation assembly of FIG. 3.

FIG. 6 shows a section view along a length of the first 32 and second 34 substrates when in the closed position. One or more fasteners 64 may be used to attach the raised boss portion 48 to the first substrate 32. One or more additional fasteners 66 may be used to couple the bracket members/support flanges 44 to the lower substrate 32 where needed.

Figure 7A:
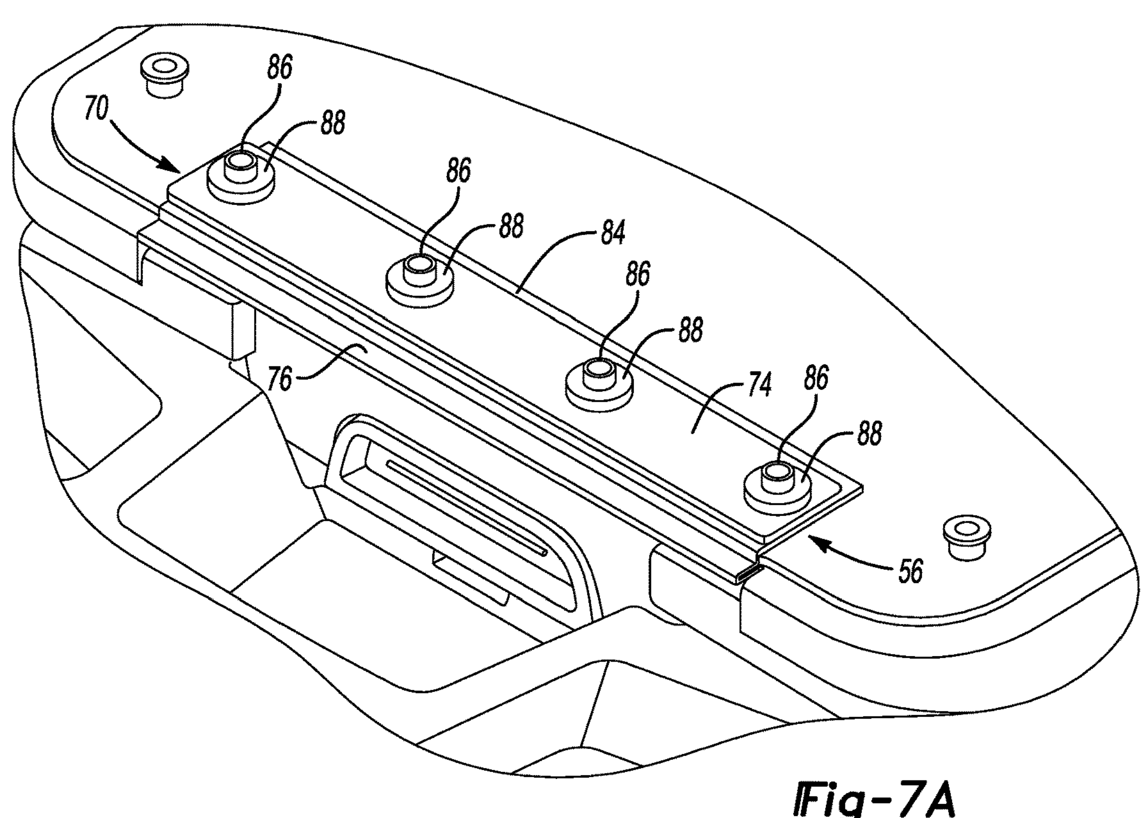
FIG. 7A is a partial perspective view of an upper portion of a living hinge that connects upper and lower substrates of the workstation assembly together.
Figure 7B:
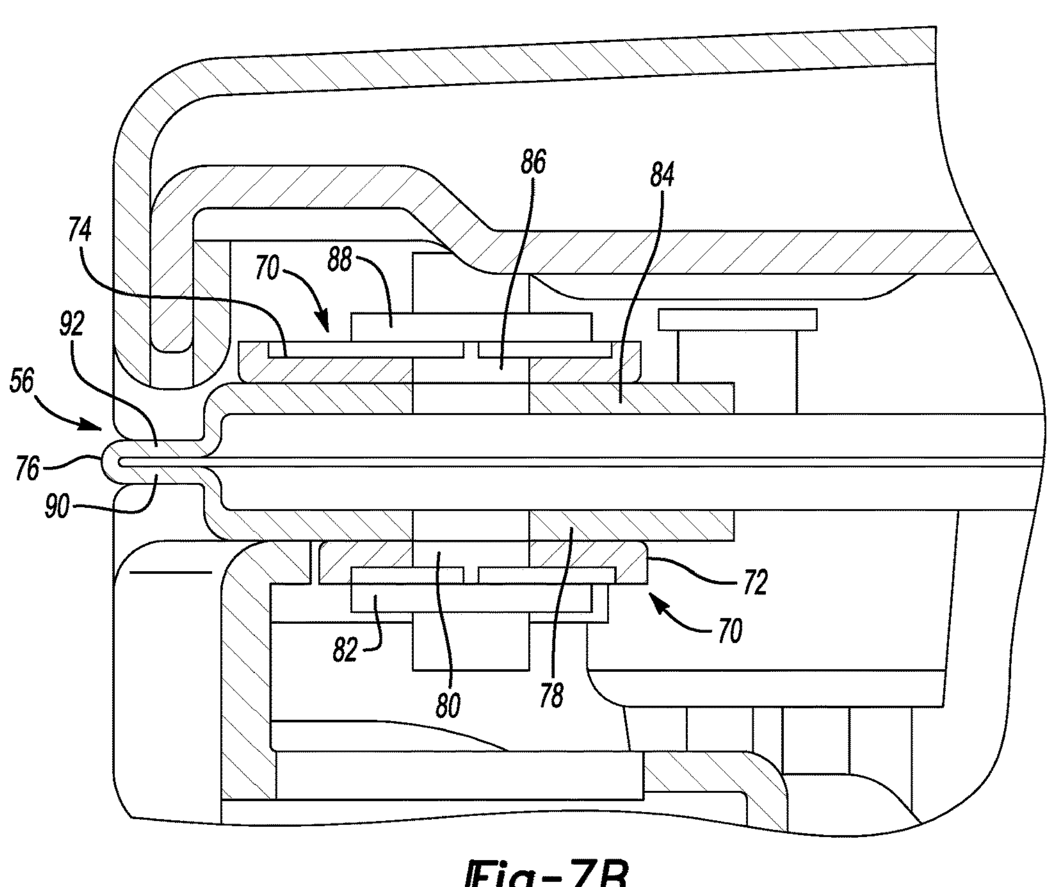
FIG. 7B is an enlarged section view of the living hinge of FIG. 7A.

In one example, the living hinge 56 is attached to the first 32 and second 34 substrates via heat staking (FIGS. 7A-7B). In one example, the living hinge 56 comprises a thermoplastic elastomer, e.g., a class of copolymers or a physical mix of polymers, such as a plastic and a rubber, that include materials with both thermoplastic and elastomeric properties. The living hinge 56 is attached to the upper substrate 34 and the lower substrate 32 with a heat stake interface as indicated at 70 in FIG. 7B. Heat staking is a process where heat is used to join parts together where at least one part is made out of plastic, and the plastic is heated to just above a glass transition temperature while simultaneously applying force to deform the plastic. The part is then cooled while under force to permanently secure the parts together.

In one example, a first heat stake plate 72 is associated with the first substrate 32, a second heat stake plate 74 is associated with the second substrate 34, and a hinge body portion 76 transitions from the first heat stake plate 72 to the second heat stake plate 74. In one example, the first heat stake plate 72 comprises a plastic sheet/plate of material covering one end 78 of the living hinge 56 and fixed to the first substrate 32 via one or more heat staking pins 80 and washers 82. In one example, the second heat stake plate 74 comprises a plastic sheet/plate of material covering an opposite end 84 of the living hinge 56 and fixed to the second substrate 34 via one or more heat staking pins 86 and washers 88. In one example, the hinge body portion 76 that transitions from the first heat stake plate 72 to the second heat stake plate 74 comprises a center folded portion of two overlapping layers 90, 92. When the upper substrate 34 is pivoted to the deployed position, the layers 90, 92 move from the folded position (FIG. 7B) to the unfolded position (FIG. 4) to provide a seamless transition between the work surfaces 36, 38.

In one example, the members 60, 62 of the magnetic closure 58 are respectively embedded, by being completely surrounded or enclosed on all sides, within material of the first 32 and second 34 substrates such that the members 60, 62 are hidden from view, e.g. not visible from the outwardly facing surfaces 36, 38 of the first 32 and second 34 substrates (FIG. 4). The one or more first members 60 embedded in the first substrate 32 comprise one or more first magnet closure members, which each member comprises a body that produces a magnetic field or is drawn to a magnetic field. The one or more second members 62 embedded in the second substrate 34 comprise one or more second magnet closure members, which each member comprises a body that produces a magnetic field or is drawn to a magnetic field.

Figure 8A:
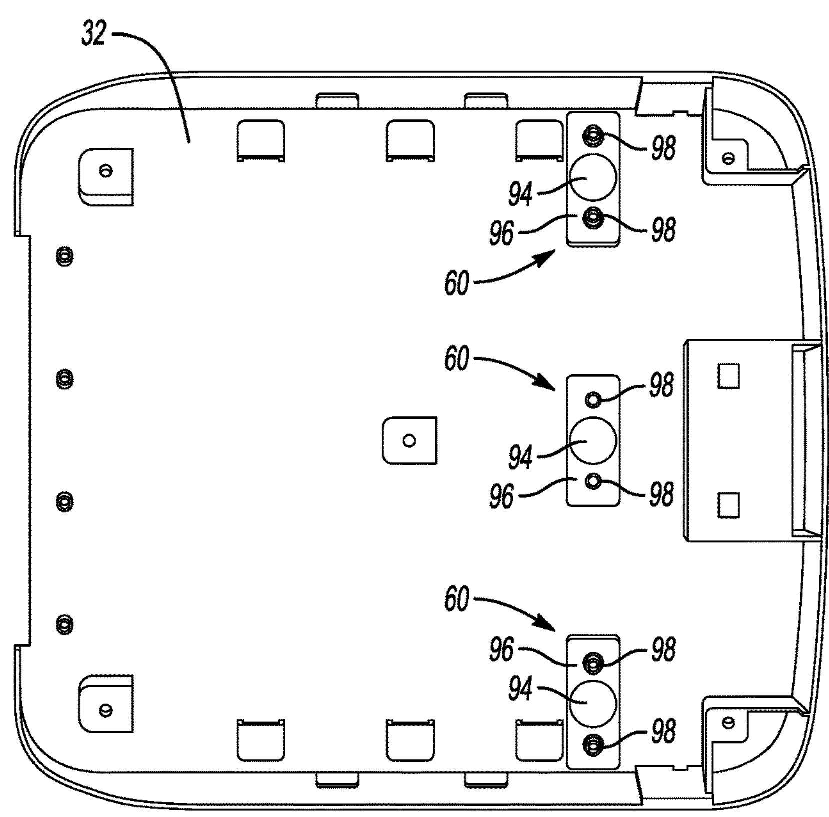
FIG. 8A is a top view of a lower work surface of the workstation assembly with magnets.
Figure 8B:
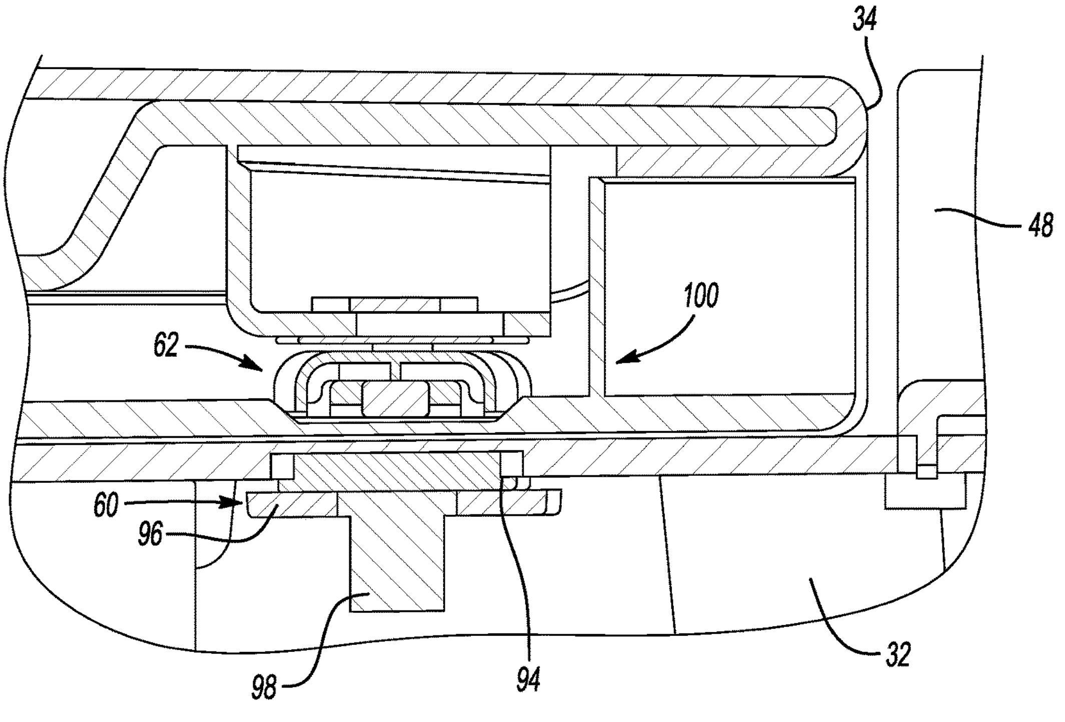
FIG. 8B is an enlarged section view of upper and lower magnetic closure members in the upper and lower substrates.

In one example, the one or more first magnet closure members 60 are heat staked within the first substrate 32 as shown in FIGS. 8A-8B. As discussed above, the process of heat staking uses heat while simultaneously applying force to deform the plastic and join the parts together. In one example, the one or more first magnet closure members 60 each comprise a discrete coin 94, where the coins 94 are spaced apart from each other across a width of the first substrate 32. The coins 94 comprise disc-shaped bodies made of metal/magnetic material. In one example, each member 60 is heat staked to the first substrate 32 with an associated heat stake plate 96. As shown in FIG. 8A, the heat stake plates 96 comprise plastic sheets/plates of material that cover each member 60, and which are fixed to the first substrate 32 with heat staking pins 98.

In one example, the one or more second magnet closure members 62 of the magnetic closure 58 are embedded within the second substrate 34 via an overmold interface 100 as shown in FIG. 8B. In one example, the one or more second magnet closure members 62 are overmolded in the second substrate 34 using an injection molding process. An injection molding process is typically used to mold one plastic, e.g. a rubber-like plastic (TPE), over the top of another component, e.g. a substrate.

In one example shown in FIG. 4, a magnetic surface of the one or more second magnet closure members 62 is greater than a corresponding surface of the one or more first magnet closure members 60. For example, the one or more second magnet closure members 62 have a bigger surface area than the one or more first magnet closure members 60 to ensure a positive positioning of the magnetic closure 58 one hundred percent of the time.

In the example shown in FIG. 4, the second magnet closure member 62 comprises a discrete shaped member, such as a bar or disc, for example, embedded in the second substrate 34; however, the second magnet closure member 62 could also comprise a plurality of coins or other discrete members similar to the first magnetic closure members 60. In one example, the discrete shaped member of the second magnet closure member 62 comprises a flat elongated body that is completely surrounded, or enclosed on all sides, by material of the second substrate 34. In one example, one or more discrete second magnet closure members 62, e.g. discs or coins, are also embedded within the second substrate 34.

In one example, a method of deploying a seat workstation assembly having a living hinge 56 and a magnetic closure 58 comprises supporting the first substrate 32 and the second substrate on the seat member base 24, overcoming a magnetic retention force holding the second substrate 34 to the first substrate 32 in a closed position, and pivoting the second substrate 34 to a deployed workstation position to extend a work surface across both the first substrate 32 and the second substrate 34.

Additional method steps may include any of the following steps in any combination. The method may include attaching the living hinge 56 to the first 32 and second 34 substrates via heat staking. In one example, the method includes heat staking one end 78 of the living hinge 56 to the first substrate 32, heat staking an opposite end 84 of the living hinge 56 to the second substrate 34, and forming a flexible hinge body 76 between the ends 78, 84 of the living hinge 56.

The method may include embedding magnetic closure members 60, 62 in the first 32 and second 34 substrates. In one example, the method includes embedding at least one first magnet closure member 60 within the first substrate 32 and embedding at least one second magnet closure member 62 within the second substrate 34 to align or overlap with the at least one first magnet closure member 60 when the second substrate 34 is pivoted to the closed position.

The method may include various embedding methods for the magnetic closure members 60, 62. In one example, the method includes heat staking the at least one first magnet closure member 60 to the first substrate 32 and overmolding the at least one second magnet closure member 62 in the second substrate 34.

The method may include providing different sizes for the magnetic closure members 60, 62. In one example, the method includes forming a magnetic surface of the at least one second magnet closure member 62 to have a greater surface area than a corresponding surface area of the at least one first magnet closure member 60. This provides the second closure member 62 with a bigger surface area than first closure member 60 to ensure positive positioning of magnet closure latching all of the time.

The method may include defining a seating position for the workstation assembly. In one example, the method includes providing a row of seats that includes a driver side seat and a passenger side seat, and the method further includes: positioning the seat member base 24 between the driver side seat 12 and the passenger side seat 14 to define an overall seating length L for the row of seats; providing 20% of the overall seating length for the seat member base 24; providing 40% of the overall seating length for the driver side seat 12; and providing 40% of the overall seating length for the passenger side seat 14.

The subject disclosure provides for a workstation assembly that is integrated with a 20% seat storage armrest, and which includes a magnetic latching system coupled with a living hinge that allows a workstation to fold open to a near-flat position. The living hinge is created with a thermoplastic elastomer and is attached to the substrates via heat staking to provide a seamless transition between the fixed substrate and the upper dynamic substrate when deployed to the fold flat position. In order to cycle or pivot the workstation, a user must overcome a retention force of the magnetic latching system by pulling upwards. When cycling the workstation to the closed position, the magnets will "re-latch" once polarity between the two surfaces of the substrates is in the detectable range, which is determined by a distance between magnetic fields. In one example, on one of the substrates, the magnetic surface is oversized with respect to its matching magnet in order to ensure positive positioning a hundred percent of the time.

In addition to creating a usable space on top of the 20% armrest where the user can physically conduct work, the magnetic latch and living hinge executions are integrated as a packaging solution where typical mechanical hinges and latches could not package in the limited space along a z-axis direction. The use of a living hinge also allows the assembly to withstand a significantly higher downward force on a cantilevered portion of the workstation because a hard stop does not live within the hinge itself. A typical mechanical hinge, i.e. metal/plastic dual-pivots, would fracture or warp once a significant downward force was inflicted past the fold flat position. This is avoided by using the living hinge.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An apparatus comprising:

a seat member base comprising a first substrate and a second substrate;

a living hinge coupling the second substrate to the first substrate such that the second substrate is moveable between a closed position and a deployed workstation position, wherein a first end of the living hinge is fixed to the first substrate via a first heat stake plate and a second end of the living hinge is fixed to the second substrate via a second heat stake plate; and a magnetic closure selectively holding the second substrate to the first substrate in the closed position.

2. The apparatus of claim 1, wherein the living hinge comprises a thermoplastic elastomer.

3. The apparatus of claim 1, wherein the first substrate includes at least one first magnet closure member and the second substrate includes at least one second magnet closure member, and wherein the at least one first magnet closure member and the at least one second magnet closure member are embedded within the first substrate and the second substrate, respectively.

4. The apparatus of claim 3, wherein the at least one first magnet closure member is embedded within the first substrate by a third heat stake plate.

5. The apparatus of claim 4, wherein the at least one first magnet closure member comprises a plurality of discrete coins spaced apart from each other across a width of the first substrate, and wherein each discrete coin is heat staked to the first substrate with an associated heat stake plate.

6. The apparatus of claim 3, wherein the at least one second magnet closure member is overmolded in the second substrate.

7. The apparatus of claim 3, wherein a magnetic surface of the at least one second magnet closure member is greater than a corresponding surface of the at least one first magnet closure member.

8. The apparatus of claim 7, wherein the at least one second magnet closure member comprises a discrete shaped member embedded in the second substrate.

9. The apparatus of claim 1, wherein the seat member base is positioned between a driver side seat and a passenger side seat, and wherein the seat member base is pivotable between an upright position and a lowered position.

10. The apparatus of claim 9, wherein an overall seating length for a row of seats including the driver side seat, the seat member base, and the passenger side seat is comprised of 20% of the overall seating length for the seat member base, 40% of the overall seating length for the driver side seat, and 40% of the overall seating length for the passenger side seat.

11. The apparatus of claim 9, wherein when the seat member base is in the upright position, a center seat is provided that is 20% of an overall seating length for a row of seats that includes the center seat.

12. The apparatus of claim 9, wherein when the seat member base is in the lowered position, an armrest is provided with a workstation area.

13. The apparatus of claim 1, wherein the first substrate is fixed to the seat member base and the second substrate is moveable from the closed position to the deployed workstation position where upwardly facing surfaces of the first substrate and the second substrate provide an extended flat work surface.

14. A method comprising:

supporting a first substrate and a second substrate on a seat member base;

heat staking one end of a living hinge to the first substrate via a first heat stake plate;

heat staking an opposite end of the living hinge to the second substrate via a second heat stake plate;

overcoming a magnetic retention force holding the second substrate to the first substrate in a closed position; and pivoting the second substrate to a deployed workstation position via the living hinge and extending a work surface across both the first substrate and the second substrate.

15. The method of claim 14, including forming a flexible hinge body between the one end of the living hinge and the opposite end of the living hinge.

16. The method of claim 14, including embedding at least one first magnet closure member within the first substrate and embedding at least one second magnet closure member within the second substrate to align with the at least one first magnet closure member when the second substrate is pivoted to the closed position.

17. The method of claim 16, including heat staking the at least one first magnet closure member to the first substrate and overmolding the at least one second magnet closure member in the second substrate.

18. The method of claim 16, including forming a magnetic surface of the at least one second magnet closure member to have a greater surface area than a corresponding surface area of the at least one first magnet closure member.

19. The apparatus of claim 1, wherein the living hinge comprises a hinge body portion comprising a center folded portion of two layers, such that when the second substrate is pivoted from the closed position to the deployed workstation position, the two layers move from a folded position to an unfolded position.

20. An apparatus comprising:

a seat member base comprising a first substrate and a second substrate;

a living hinge coupling the second substrate to the first substrate such that the second substrate is moveable between a closed position and a deployed workstation position; and a magnetic closure selectively holding the second substrate to the first substrate in the closed position, wherein the first substrate comprises at least one first magnet closure member, and wherein the at least one first magnet closure member is embedded within the first substrate by a heat stake plate.

* * * * *